Dec. 26, 1933.  J. E. SUMPTER ET AL  1,940,704
ELECTRIC CABLE CLAMPING PLATE
Filed Nov. 29, 1930

Inventor
John E. Sumpter
Alfred Alsaker
By
Attorney

Patented Dec. 26, 1933

1,940,704

UNITED STATES PATENT OFFICE 1,940,704

ELECTRIC CABLE CLAMPING PLATE

John E. Sumpter, Minneapolis, Minn., and Alfred Alsaker, Chicago, Ill., assignors to Delta-Star Electric Company, Chicago, Ill., a corporation of Illinois Application November 29, 1930
Serial No. 498,982

7 Claims. (Cl. 173—263)

This electric cable clamping plate is designed to be stamped from a piece of sheet material such as copper or other material having a high electric conductivity so that it may be used to directly contact with the electric cable and act as a conductor in engaging the cable to connect the same to an electric connector or plate or to clamp cables together to make an efficient electric connection.

Primarily the stamping of the plate member from a unitary piece of material is important because it provides a simple inexpensive structure and also accomplishes a means of forming gripping means for clamping bolts which are carried by the clamping plate to hold the bolts in place as a unit structure with the plate and to provide a plate with a cable groove formed therein.

The connector may be made with the clamping plate proper, that is the top of the clamping plate stamped from a single piece of material, while the bottom part may be forged or cast of copper or other suitable material to form a base into which the electric cable may be engaged. Should it be desired to stamp both bottom and top portions of the clamp this may be carried out in accordance with our invention but such clamps may be preferably used for smaller electric cables where the heavier strain of clamping is not as prevalent as in large electric cables. When both plates are stamped to provide an electric cable engagement the structure is very simple yet effective to hold two or more cables together if it is desired.

We will endeavor to point out the details of structure of importance throughout the specification and claims.

In the drawing forming part of this specification:

Our clamping plate A is formed by stamping the body 10 out of heavy sheet material. The body 10 is formed with transversely disposed ears 11 projecting from the sides of the same in which the bolt openings 12 are formed.

Figure 1:
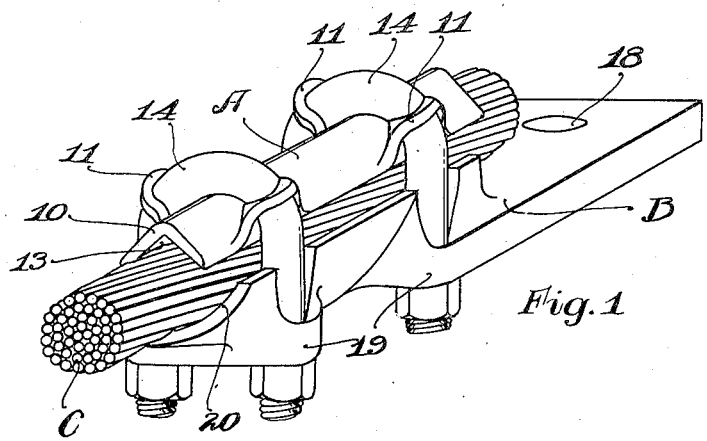
Figure 1 is a perspective view of our electric cable connector.
Figure 2:
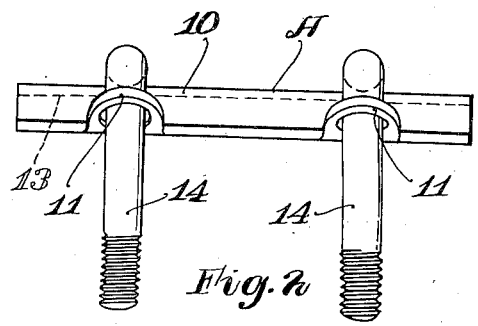
Figure 2 is a side view of the top clamping plate as a unit with the clamping bolts.
Figure 4:
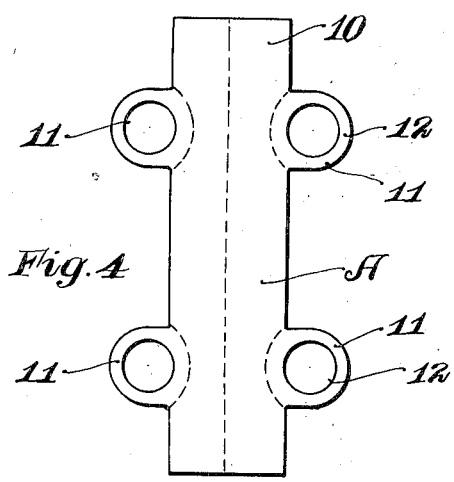
Figure 4 illustrates a plan view of the clamping plate as it would appear stamped out before the same has been shaped to engage the bolts.
Figure 3:
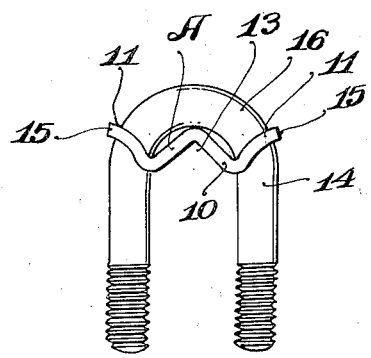
Figure 3 is an end view of Figure 2.

When the plate A is formed for use as a top plate member it is bent with a longitudinal cable groove 13 extending through the same and after the bolts 14 have been set extending through the openings 12 and straddling over the ends of the body 10 of the plate A the ears 11 are bent up as illustrated in Figures 2 and 3 so as to form a spring engaging means against the sides of the bolts 14. Thus the ears 11 pinch against the bolts 14 and hold the bolts against slipping out.

In bending the ears 11 up against the sides of the bolts 14 the outer extremity 15 of the ears is bent up over the arcuated portion 16 of the bolts 14 so as to form shoulders at the points 15 as illustrated in Figure 3 which hold the bolts from disengagement from the plate A out of the openings 12. This primary feature of the engaging ears 11 to hold the bolts 14 in place accomplishes a simple effective means of providing a unitary clamping plate A with clamping bolts 14.

The plate A may be formed with one bolt 14 and only one pair of transversely disposed clamping ears 11. This will depend upon the size of the clamp to be clamped or the particular use of the clamping plate A. When it is desired to use our clamping plate A in conjunction with a heavy base such as B to provide an electric connector having a flat end 18 adapted to be connected for other electrical connections not illustrated, the bolts 14 may extend through the large ears 19 formed in the base B and a very substantial and strong channel 20 for receiving the cable C may be provided.

Figure 5:
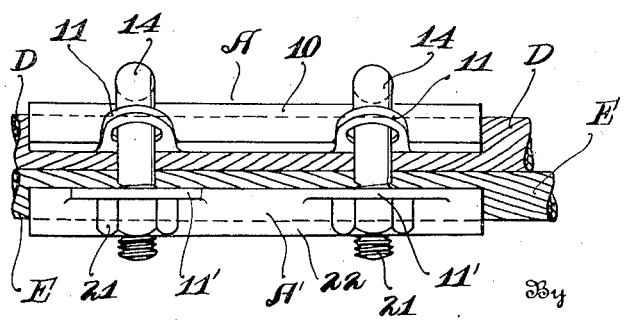
Figure 5 illustrates another form where the top and bottom plates are both stamped out from heavy sheet material having an electric conductivity of a desirable nature.

It may be desirable in some cases to use our clamping plate A such as disclosed in Figure 5, where the bolts 14 are held by the body 10 of the upper plate A and a similarly formed plate A' is provided which is virtually identical with the plate A having transversely disposed ears 11' which instead of being bent up as are the ears 11 of the plate A, are formed flat so that they will form a plate against which the nuts 21 may firmly engage. This structure provides a very practical simple electrical clamp for connecting two cables such as D and E together, particularly where small electrical cables are used which do not require heavy clamping pressure. However, if the plates A and A' are stamped of sufficiently heavy material they will be very strong and a clamping force may be exerted against the same which will bind the cables D and E tightly together.

In the structure of Figure 5 the nuts 21 are closely disposed to the sides of the clamping plate A' and the plates 11' are positioned below the upper longitudinal outer edge 22 of the plate A'. This provides a structure with the plate A which will be closely adhered to the cables D and E, making a small and efficient electrical clamping plate means.

We claim:

1. An electric cable clamp formed of a sheet metal having an efficient electric conductivity, transversely disposed ears formed on the sides thereof, a bolt adapted to straddle said plate extending through said ears, and shoulders formed by bending the ends of said ears up against the sides of said bolt to form a unitary plate and bolt clamping structure.

2. An electric cable clamp formed with cable clamping members stamped from sheet metal, one of said members having ears transversely disposed therefrom, a bolt extending through said ears with an arcuated straddling portion extending across the top of one of said clamping plates, shoulders formed by bending the ends of said ears over the arcuated portion of said bolt, and the other of said plates formed with transversely disposed flat ears adapted to engage the ends of said bolt and to provide a nut recess on the sides of said last plate disposed below the upper longitudinal edge of said plate.

3. An electric cable clamp including, a pair of clamping plates stamped from sheet metal, one of said plates having bolt engaging ears transversely disposed thereof and bent to engage the sides of a U-bolt to hold the same unitary with said plate, and the other of said plates formed with transversely disposed bolt receiving ears having a nut engaging flat plate-like surface disposed below the outer upper edge of said plate.

4. An electric cable clamping plate including, a plate member stamped from a sheet metal, ears formed on the sides of said sheet, a longitudinal cable groove formed therein to shape the plate with a channel extending longitudinally thereof, and shoulders formed by said ears by bending the same against the sides of a bolt to hold the same unitarily with said plate.

5. A clamping plate for electric cables including, a plate body portion formed of sheet material, pairs of ears transversely disposed along said body, bolts each having threaded ends and an arcuated portion adapted to straddle said plate extending through said ears, and bolt locking means formed by bending said ears up against the arcuated straddling portion of said bolts to engage said bolts under spring tension of said ears and plate to provide a unitary plate and bolt clamping structure for electric cables.

6. An electric cable clamp formed of heavy sheet copper or the like, having a spring nature, a longitudinal cable channel groove formed in said sheet, ears formed in stamping said sheet on either side of said channel, clamping bolts engaging the outside bottom of the channel groove, said ears forming spring engaging means to lock said clamping bolts to said plate.

7. An electric cable clamping plate having a body portion formed with a V-shaped cross section extending longitudinally throughout the plate, U-bolts threaded on the ends, and ears formed integrally on the sides of said plate, the ends of said ears being bent up over the arc of said U-bolts to form shoulders, to hold the bolts in a unitary manner with the plate.

JOHN E. SUMPTER.
ALFRED ALSAKER.